United States Patent
Johnson

(10) Patent No.: US 9,745,855 B2
(45) Date of Patent: Aug. 29, 2017

(54) LINEAR FRICTION WELDING APPARATUS AND METHOD

(71) Applicant: APCI, LLC, South Bend, IN (US)

(72) Inventor: Stephen A. Johnson, South Bend, IN (US)

(73) Assignee: APCI, LLC, South Bend, IN (US)

( * ) Notice: Subject to any disclaimer, the term of this patent is extended or adjusted under 35 U.S.C. 154(b) by 411 days.

(21) Appl. No.: 14/359,286

(22) PCT Filed: Dec. 5, 2012

(86) PCT No.: PCT/US2012/067964
§ 371 (c)(1),
(2) Date: May 19, 2014

(87) PCT Pub. No.: WO2013/086006
PCT Pub. Date: Jun. 13, 2013

(65) Prior Publication Data
US 2014/0325842 A1    Nov. 6, 2014

Related U.S. Application Data

(60) Provisional application No. 61/630,129, filed on Dec. 5, 2011, provisional application No. 61/630,156, filed on Dec. 5, 2011.

(51) Int. Cl.
*B23K 20/12*    (2006.01)
*F01D 5/30*    (2006.01)
*B23P 15/00*    (2006.01)

(52) U.S. Cl.
CPC ........ *F01D 5/3061* (2013.01); *B23K 20/1205* (2013.01); *B23K 20/129* (2013.01); *B23K 20/1245* (2013.01); *B23P 15/006* (2013.01); *Y10T 29/49321* (2015.01)

(58) Field of Classification Search
CPC . F01D 5/3061; B23P 15/006; B23K 20/1245; B23K 20/129; B23K 20/1205; Y10T 29/49321
See application file for complete search history.

(56) References Cited

U.S. PATENT DOCUMENTS

| | | |
|---|---|---|
| 4,811,887 A | 3/1989 | King et al. |
| 5,486,262 A | 1/1996 | Searle |
| 5,518,562 A * | 5/1996 | Searle ................. B23K 20/129 156/580 |
| 5,562,245 A | 10/1996 | Berthelemy et al. |
| 7,624,907 B2 | 12/2009 | Alessi et al. |
| 2011/0129347 A1 | 6/2011 | Schneefeld et al. |

* cited by examiner

*Primary Examiner* — Richard Chang
(74) *Attorney, Agent, or Firm* — Maginot, Moore & Beck, LLP

(57) ABSTRACT

The apparatus and method allows multiple components to be simultaneously bonded to a central shaft or tube using linear friction welding in a single welding process. The method involves simultaneously pressing the work pieces radially against the central shaft or tube at the desired locations while the shaft is vibrated axially. The weld is facilitated by the use of a linear friction welding machine, which includes a number of fixtures and press assemblies to hold and press the various work pieces against the central shaft or tube and a vibrating assembly for vibrating the central shaft or tube.

8 Claims, 7 Drawing Sheets

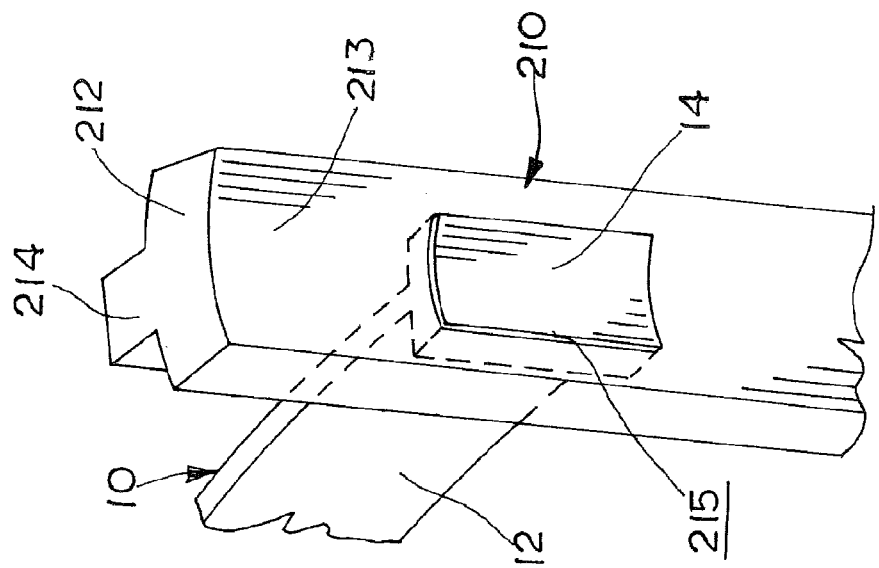
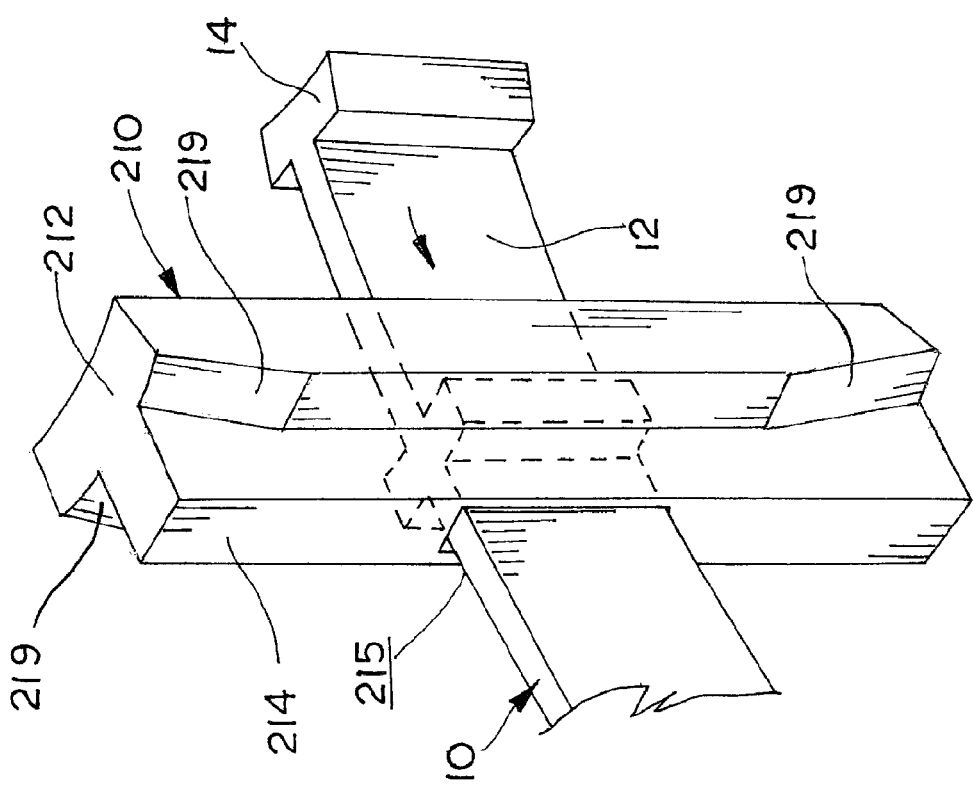

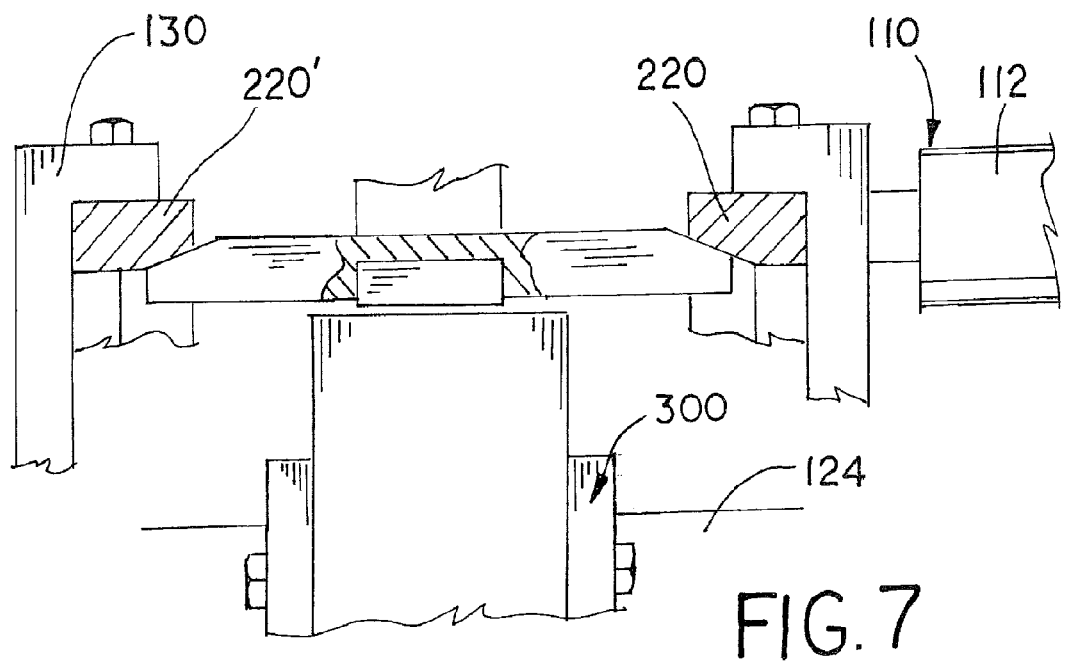
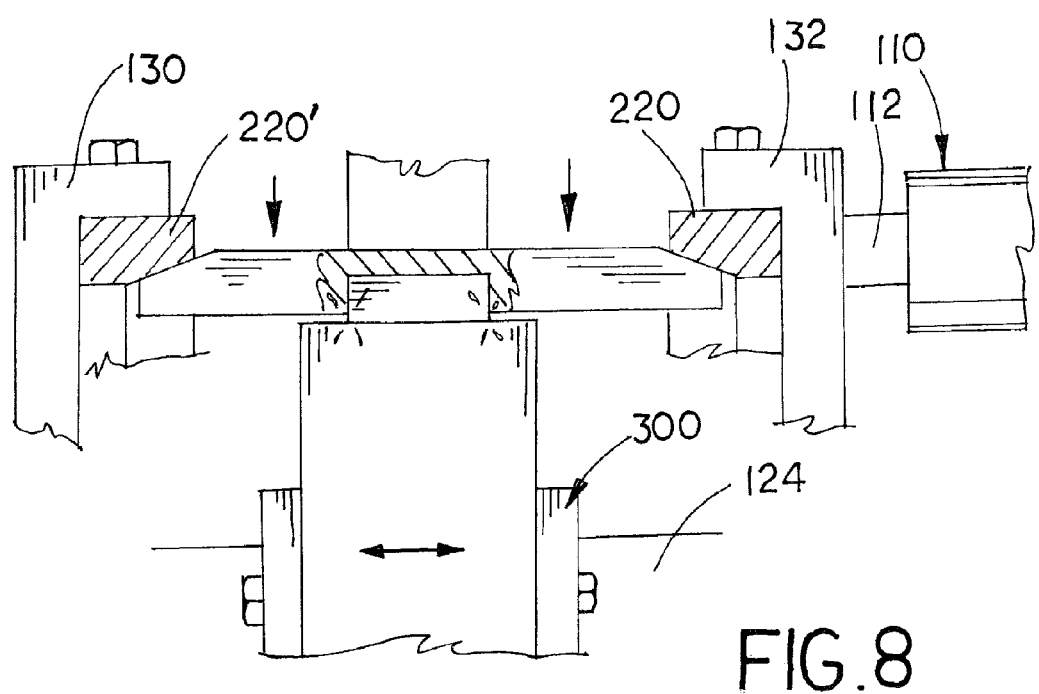

LINEAR FRICTION WELDING APPARATUS AND METHOD

This application is a 35 U.S.C. §371 National Stage Application of PCT/US2012/067964, filed on Dec. 5, 2012, which claims the benefit of U.S. Provisional Patent Application, Ser. No. 61/630,156 filed Dec. 5, 2011, and U.S. Provisional Patent Application, Ser. No. 61/630,129 filed Dec. 5, 2011, the entirety of which are each both incorporated by reference herein.

This invention relates to an apparatus and method for simultaneously welding multiple components to a central component using linear friction welding.

BACKGROUND AND SUMMARY OF THE INVENTION

Many manufactured products require multiple components to be bonded and welded to a central tube, shaft or hub. In most instances, each component must be bonded to the central component in a separate welding process regardless of the type of welding process used. Consequently, producing such components is difficult, expensive and time consuming. In another example, integrally bladed rotors or "blisks" are critical components in certain aircraft engines. A blisk is a single engine component consisting of a plurality of rotor blades extending radially from a rotor disk or hub. Blisks can be produced using various manufacturing processes, including CNC milling, investment casting, electro-chemical machining, or welding. Heretofore, these conventional manufacturing processes, particularly welding individual rotor blades to the rotor hub have been difficult, expensive and time consuming.

Linear friction welding (LFW) is a process of joining two components which may be made from the same or different materials. The LFW process typically involves pressing the two components together under a large amount of force and rapidly oscillating the components with respect to one another to generate friction at the interface between the two components. The pressure and movement generate sufficient heat to cause the material at the interface to plasticize. Once the material at the interface begins to plasticize, the oscillation is stopped and an increased force is applied. As the plasticized material of both components cools in this static condition, the components are bonded together and a weld is formed. While LFW is suitable in many applications, heretofore, LFW has been limited to bonding only two components together at one time.

The linear friction welding (LFW) apparatus and methods of this invention allows multiple components to be simultaneously bonded to a central shaft, tube or hub using linear friction welding in a single welding process. The LFW apparatus of this invention employs linear friction welding machines, such as the ones available from APCI, Inc. of South Bend, Ind. and disclosed in U.S. Pat. No. 8,070,039 issued on Dec. 6, 2011. The LFW machine generally includes a number of fixtures and press assemblies to hold and press the various work pieces against the central shaft, tube and a vibrating assembly for vibrating the central shaft, tube or hub.

In one embodiment, the LFW apparatus and method of this invention allows multiple work pieces to be bonded to an elongated shaft in a single weld process. The LFW apparatus includes multiple work piece fixtures operatively connected to the press assembly of an LFW machine while the shaft is operatively connected to the vibrating assembly of the LFW machine. In another embodiment, LFW apparatus and method of this invention allows multiple rotor blades to be bonded radially around a central rotor hub in a single weld process to create a blisk. In this embodiment, a collet assembly holds and presses the blades against the rotor hub, which is shiftably disposed within the collet assembly and supported by a mounting fixture. The collet assembly is operatively connected to the press assembly of the LFW machine, which uniformly presses the blades inward radially against the rotor hub of the blisk. The rotor hub is supported by a fixture operatively connected to the vibrating assembly of the LFW machine, which vibrates the hub axially within the collet assembly.

In each embodiment, the weld is formed by the LFW machine vibrating the central work piece axially while the other work pieces are pressed against the central piece under an initial load or "weld pressure." Friction between the work pieces causes the material at the weld surfaces to plasticize. When the vibration is stopped, the work pieces are pressed together under a final load or forging pressure, which forms the weld interface bonding the pieces together.

The apparatus and method of the present invention may take form in various systems and components, as well as the arrangement of those systems and components. The above described features and advantages, as well as others, will become more readily apparent to those of ordinary skill in the art by reference to the following detailed description and accompanying drawings. The drawings are only for purposes of illustrating exemplary embodiments and are not to be construed as limiting the invention.

BRIEF DESCRIPTION OF THE DRAWINGS

The drawings illustrate the present invention, in which:

FIG. 3 is a partial perspective view of a collet section and rotor blade;

FIG. 4 is another perspective view of a collet section and rotor blade;

FIG. 7 is side view of the collet assembly, rotor blades and rotor hub and a portion of the linear friction welding machine; and FIG. 8 is another side view of the collet assembly, rotor blades and rotor hub and a portion of the linear friction welding machine of FIG. 7 showing the rotor hub being vibrated.

DESCRIPTION OF THE PREFERRED EMBODIMENT

Figure 1:
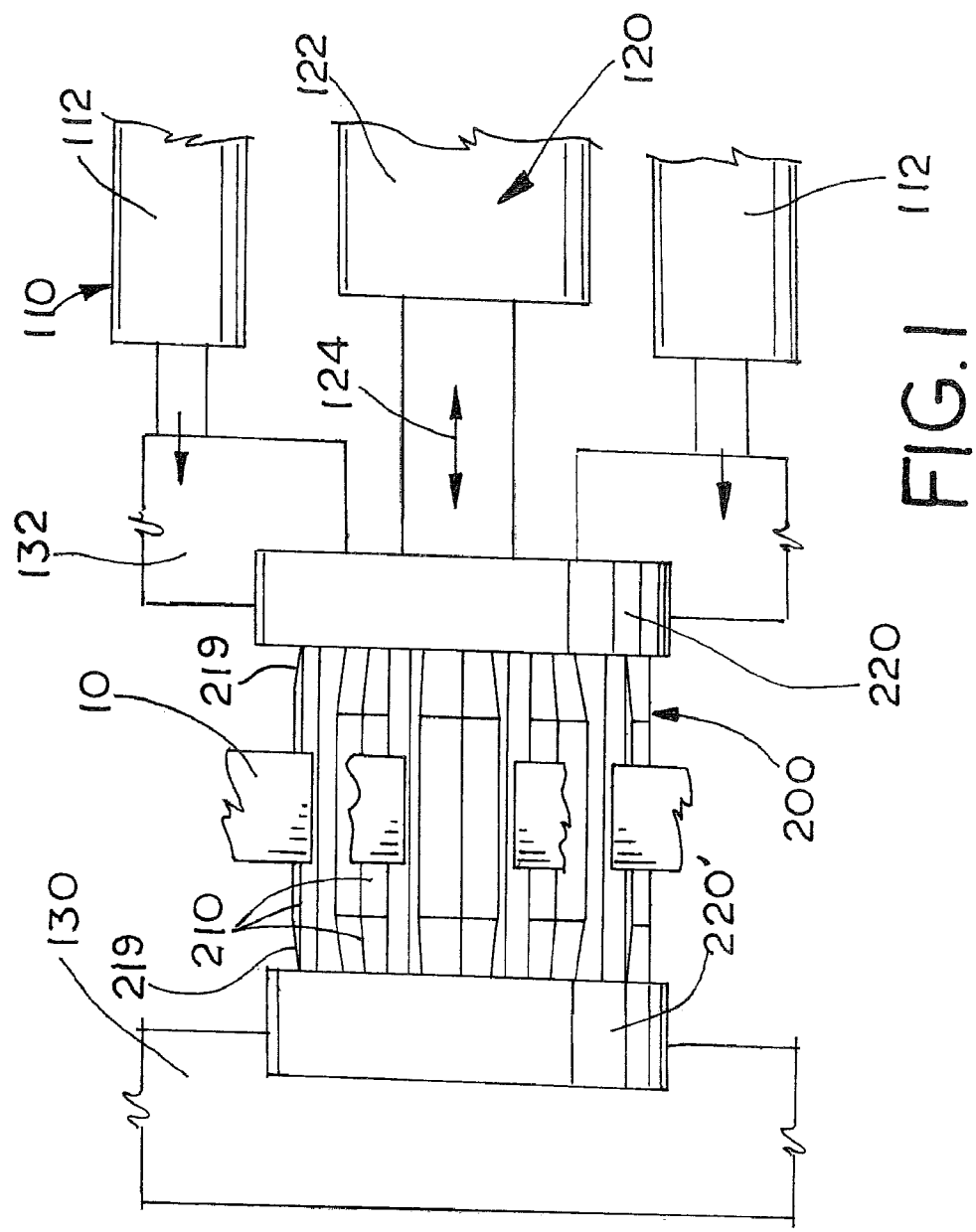
FIG. 1 is partial side view of an embodiment of the collet assembly and a portion view of the linear friction welding machine.

Referring now to the drawings, FIGS. 1-8 illustrate a simplified embodiment of an apparatus and method of this invention used for welding multiple rotor blades 10 to a blisk hub 20 using linear friction welding (LFW). The apparatus and method of this invention are illustrated in the drawing and explained hereinafter by way of example of one embodiment and/or application of the present invention, although, those skilled in the art may readily adapt and apply the teaching of this invention to other embodiments and applications.

As shown, each rotor blade 10 has a generally flat elongated body 12 that terminates at one end in an end block 14. The outer face 15 of end block 14 is concave to correspond generally with the curved outer face of the blisk hub 20. The shape, size and contour of rotor blades 10 may vary with each particular application and embodiment as desired. Rotor hub 20 has a flat annular body. The length, diameter and configuration of rotor hub 20 may also vary with each particular application and embodiment as desired.

While the method of this invention may employ the use of any linear friction welding (LFW) apparatus, fixtures and machines, the method is ideally employed using linear friction welding (LFW) apparatus, fixtures and machines, such as the ones developed by APCI, Inc. in South Bend, Ind. and described in U.S. Pat. No. 8,070,039 on Dec. 6, 2011. The teachings of U.S. Pat. No. 8,070,039 are incorporated herein by reference. The LFW apparatus, fixtures and machines from APCI are ideal for the repair process of this invention because of their ability to control the amplitude, frequency and termination of the weld oscillation, as well as the weld and force pressures during the weld process.

The LFW machine generally includes a press assembly 110 and a vibrating assembly 120. Press assembly 110 provides the weld and forging pressures that are applied to rotor blades 10 and blisk hub 20 during the weld process. For simplicity of illustration and explanation, only partial and simplified illustrations of press assembly 110 and vibrating assembly 120 of the LFW machine are shown. The particular components of the LFW machine and their operation may be inferred by reference to the above identified patent application and patent. Press assembly 110 in certain embodiments will include a number of hydraulic rams 112 along with the various other supports, guides, fixtures, controllers and similar and related components. Vibrating assembly 120 facilitates the vibration of blisk hub 20 during the weld process. Vibrating assembly 120 in certain embodiments will includes a vibrating mechanism 122 and a drive shaft 124 along with the various other supports, guides, fixtures, controllers and similar and related components.

As shown in FIG. 1, rotor hub 20 is securely held by a fixture 300 operatively connected to vibrating assembly 120 of the LFW machine. Fixture 300 may take any form or configuration depending on the size and shape of the rotor hub of the particular application. Fixture 300 may also be adapted as necessary to operatively connect to vibrating assembly 120 of the particular LFW machine employed. Rotor blades 10 are securely held radially against the rotor hub 20 by a collet assembly 200 that is operatively connected to press assembly 110 of the LFW machine. Blade collet 200 is configured to hold the plurality of rotor blades 10 in place radially around rotor hub 20, which is axially disposed within collet assembly 200 for axial movement therein. As with mounting fixture 300, collet assembly 200 may take such form or configuration as to accommodate the size, shape and number of rotor blades to be bonded to the rotor hub of the particular application. Collet assembly 200 may also be adapted as necessary to operatively connected with the press assembly of the particular LFW machine employed. As best shown in FIGS. 1-4, collet assembly 200 includes a plurality of collet sections 210 and a pair of annular end collars 220. Each Collet section 210 securely positions one of rotor blades 10 around rotor hub 20. Each guide section 210 has a T-shaped cross section formed by a base 212 and a central rib 214. The base 212 of each collect section has a concave outer face 213 which corresponds to the curvature of the outer diameter of rotor hub 20. The outer face of each collet section terminates at both ends in a sloped end face 219. Each guide section also has an opening 215 for receiving a rotor blade 10. As shown, end collars 220 precisely position and radially space the plurality of collet sections 210 around rotor hub 20 and are shiftably seated over the ends of the aligned collet sections 210. Each end collar 220 has an annular body 222 with a central opening 221. A plurality of radial slots 223 are formed in the inner diameter of collars 220 through which ribs 20 extend. The inner diameter of both collars 220 also have sloped surfaces 224, which shiftably seat against sloped surfaces 219 of each guide section 210. One of end collars 220 is operatively connected to press assembly 110 of the LFW machine by a fixture 132. The other end collar 220' is mounted to a fixed platform 130. When end collars 220 are moved axially toward one another over the ends of the aligned collet sections 210, the engagement of sloped surfaces 219 and 224 causes collet sections 210 to be drawn radially inward.

Figure 6:
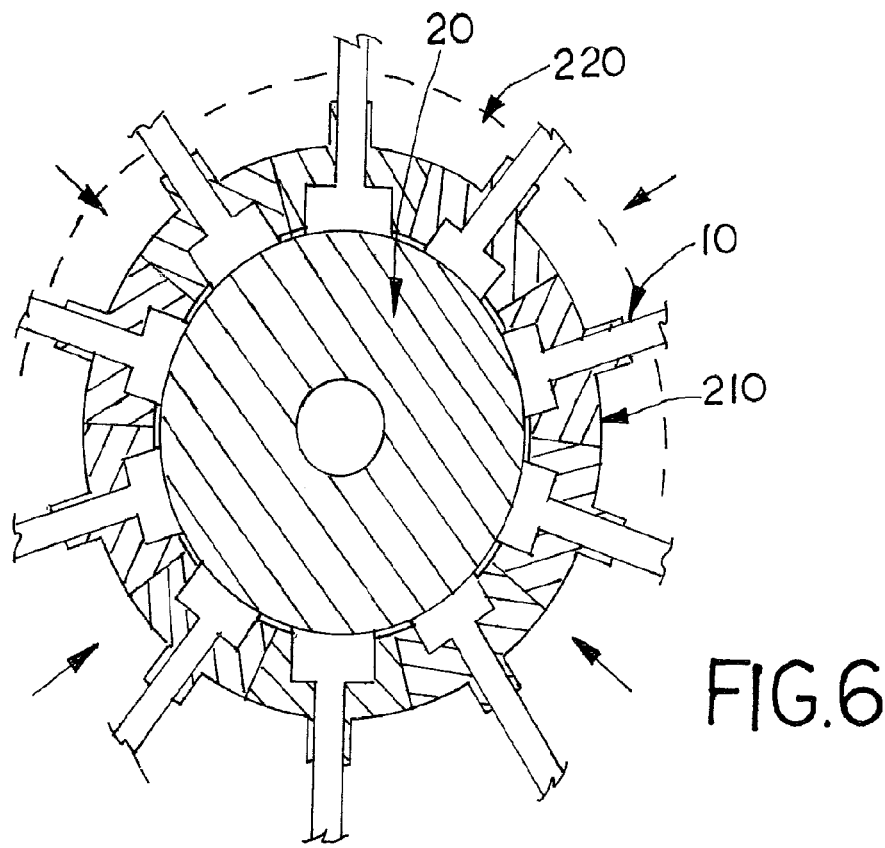
FIG. 6 is another sectional view of the collet assembly, rotor blades and rotor hub.

Once rotor blades 10 and rotor hub 20 are properly seated within collet assembly 200 and mounting fixture 300 respectively, the LFW machine can be activated to form the weld interface. Vibrating assembly 120 of the LFW machine vibrates rotor hub 20 within the collet assembly 300 while press assembly 110 of the LFW machine drives end collar 220 toward the other end collar 220' over the ends of the aligned collet sections, which simultaneously and uniformly press each of the plurality of rotor blades 10 against the rotor hub under an initial load or "weld pressure" (FIGS. 6 and 8). Friction causes the material at the weld surfaces of the rotor blades 10 and rotor hub 20 to plasticize. Once the weld surfaces are plasticized, vibrating assembly 120 abruptly terminates the vibration of rotor hub 20 and press assembly 110 presses rotor blades 10 against the rotor hub 20 under a final load or forging pressure, which forms and sets the weld interface bonding the blades permanently to the rotor hub.

Alternative Embodiment

Figure 9:
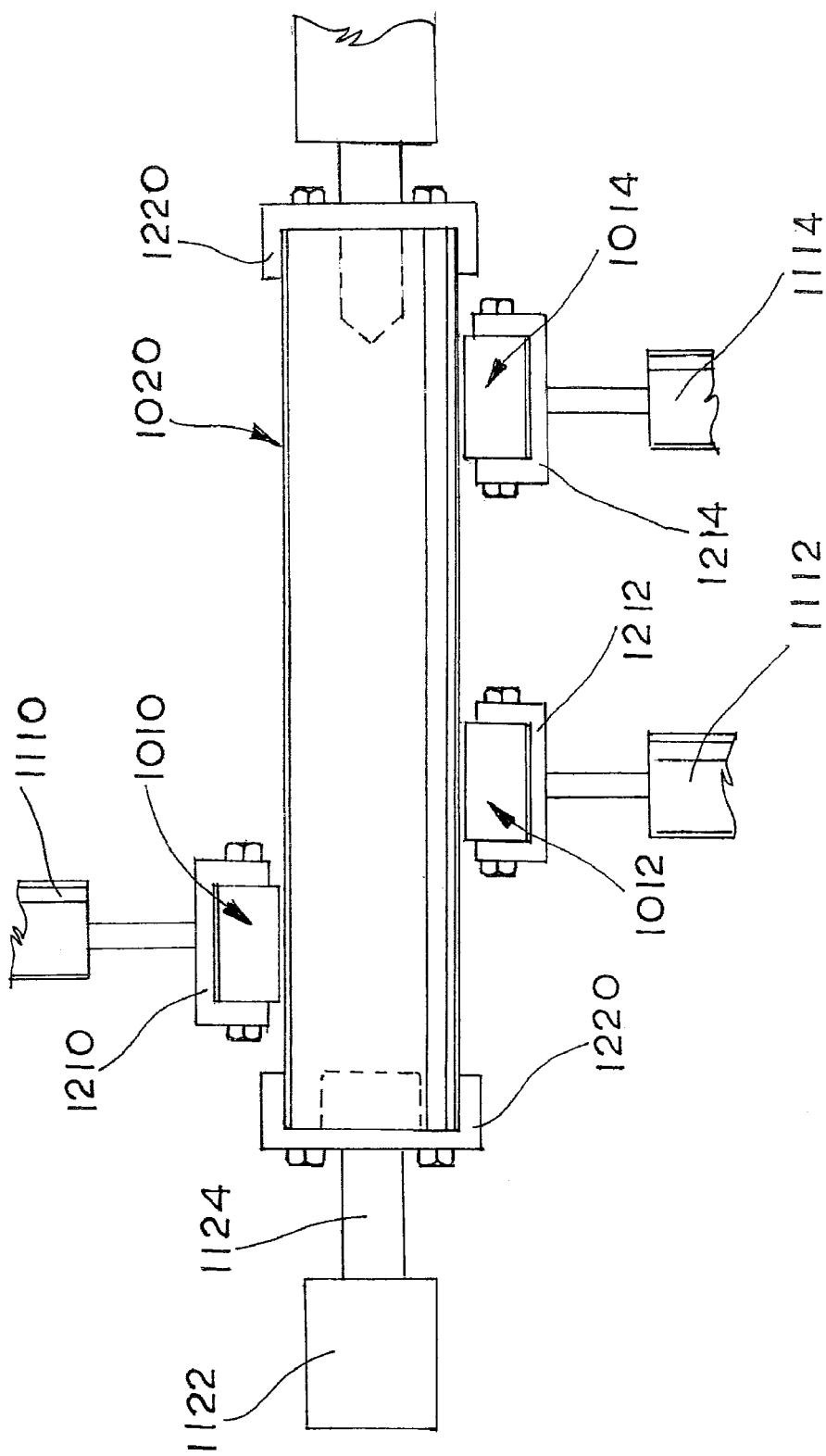
FIG. 9 is side view of a central shaft and three work pieces to be welded to the shaft using the method of this invention and a linear friction welding machine.
Figure 10:
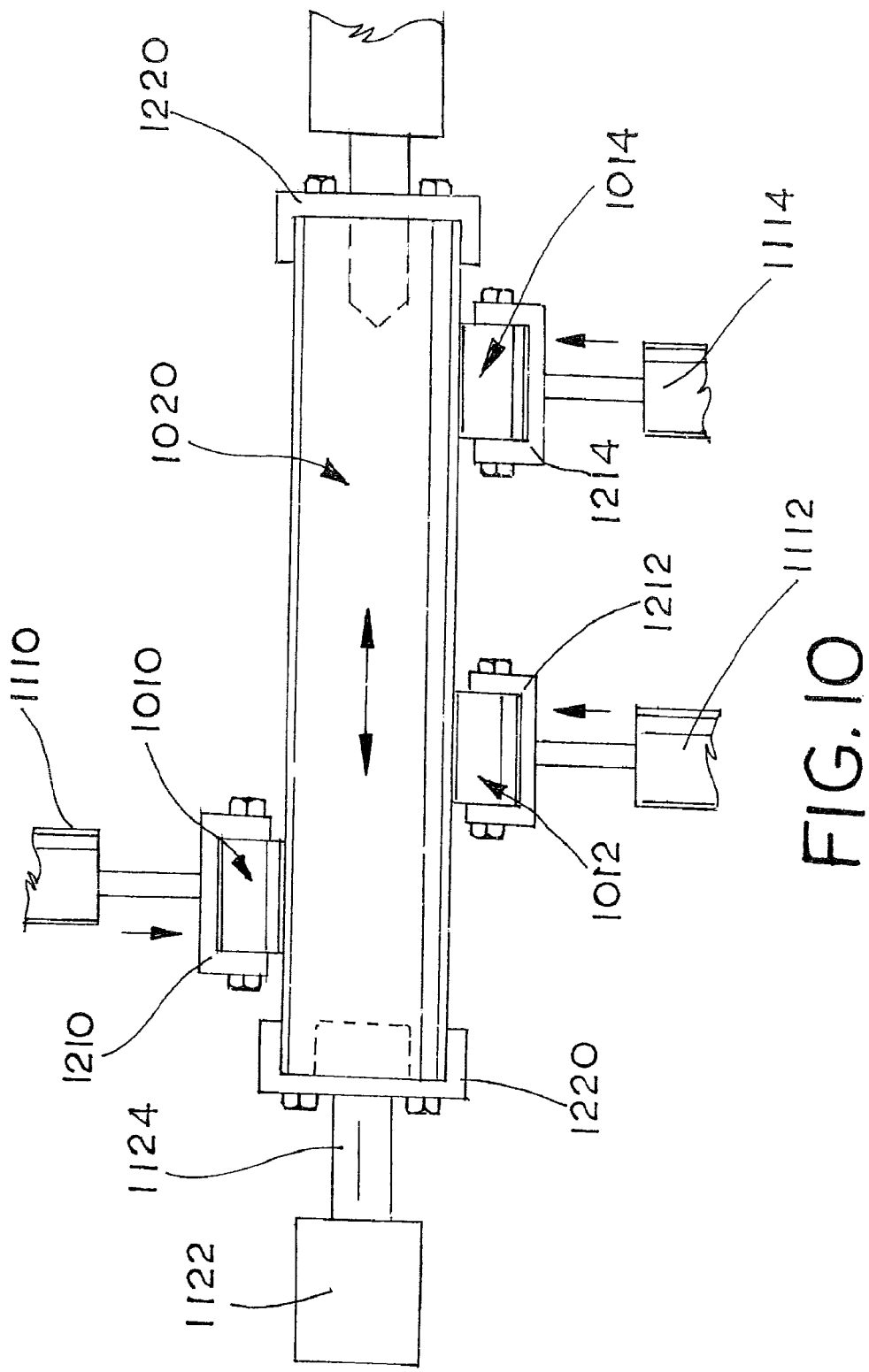
FIG. 10 is a side view of the central shaft and the three work pieces being pressed against the shaft as the shaft is vibrated to form the weld interface using the method of this invention.

Referring now to the drawings, FIGS. 9-10 illustrate another embodiment of the apparatus and method of this invention for welding multiple work pieces to a central shaft or tube using a linear friction welding (LFW) machine (not shown). The apparatus and method of this invention is illustrated and explained hereinafter by way of example in the joining of three generally square work pieces 1010, 1012, and 1014 to an elongated central shaft 20, although, those skilled in the art may readily adapt and apply the teaching of this invention to other applications. The apparatus and method of this invention is suitable for bonding multiple components to a central shaft or tube regardless of the size and configuration of those components or their location and orientation with respect to the shaft or tube. In addition, the apparatus and method of this invention can be used generally regardless of configuration or metal composition of the work pieces or central shaft.

Again, the method of this invention may employ the use of any linear friction welding (LFW) apparatus, fixture or machine; however, the method is best employed using linear friction welding (LFW) apparatus, fixtures and machines, such as the ones developed by APCI, Inc. in South Bend, Ind. and described in U.S. Pat. No. 8,070,039 on Dec. 6, 2011. The LFW apparatus, fixtures and machines from APCI are ideal for the repair process of this invention because of their ability to control the amplitude, frequency and termination of the weld oscillation, as well as the weld and force pressures during the weld process. The teachings of the above identified U.S. patent are incorporated herein by reference.

The LFW machine generally includes a pressing assembly, which provides the weld and forge pressure to the components being bonded and a vibrating assembly, which vibrates the components to generate friction between the components. For simplicity of illustration and explanation, the LFW machine is not shown. The particular components of the LFW machine and their operation may be inferred by reference to the above identified patent application and patent. The drawings only partial show the press assembly, namely hydraulic rams 1110, 1112 and 1114 and mounting fixtures 1210, 1212 and 1214 respectively. The drawings also only partially illustrate the vibrating assembly, namely the simplified oscillator mechanism 1122, drive shaft 1124 and mounting fixture 1220.

As shown, central shaft 1020 is securely held by a fixture 1220, which is operatively connected to drive shaft 1124 of the vibrating assembly. Fixture 1220 may take any form or configuration depending on the diameter of shaft 1020 for the particular application. Each of work pieces 1010, 1012 and 1014 are securely held by fixtures 1210, 1212 and 1214, which are operatively connected to hydraulic rams 1110, 1112 and 1114 of the press assembly respectively. It should be noted that each ram 1110, 1113 and 1114 operates independently of the other, but the LFW machine controls the operation of each ram to simultaneously press work pieces 1010, 1012 and 1014 against shaft 1020 during the weld process. In addition, the LFW machine is adapted and configured so that the position of the rams and fixtures properly locates work pieces 1010, 1012 and 1014 at the desired location along the length of shaft 1020.

Figure 2:
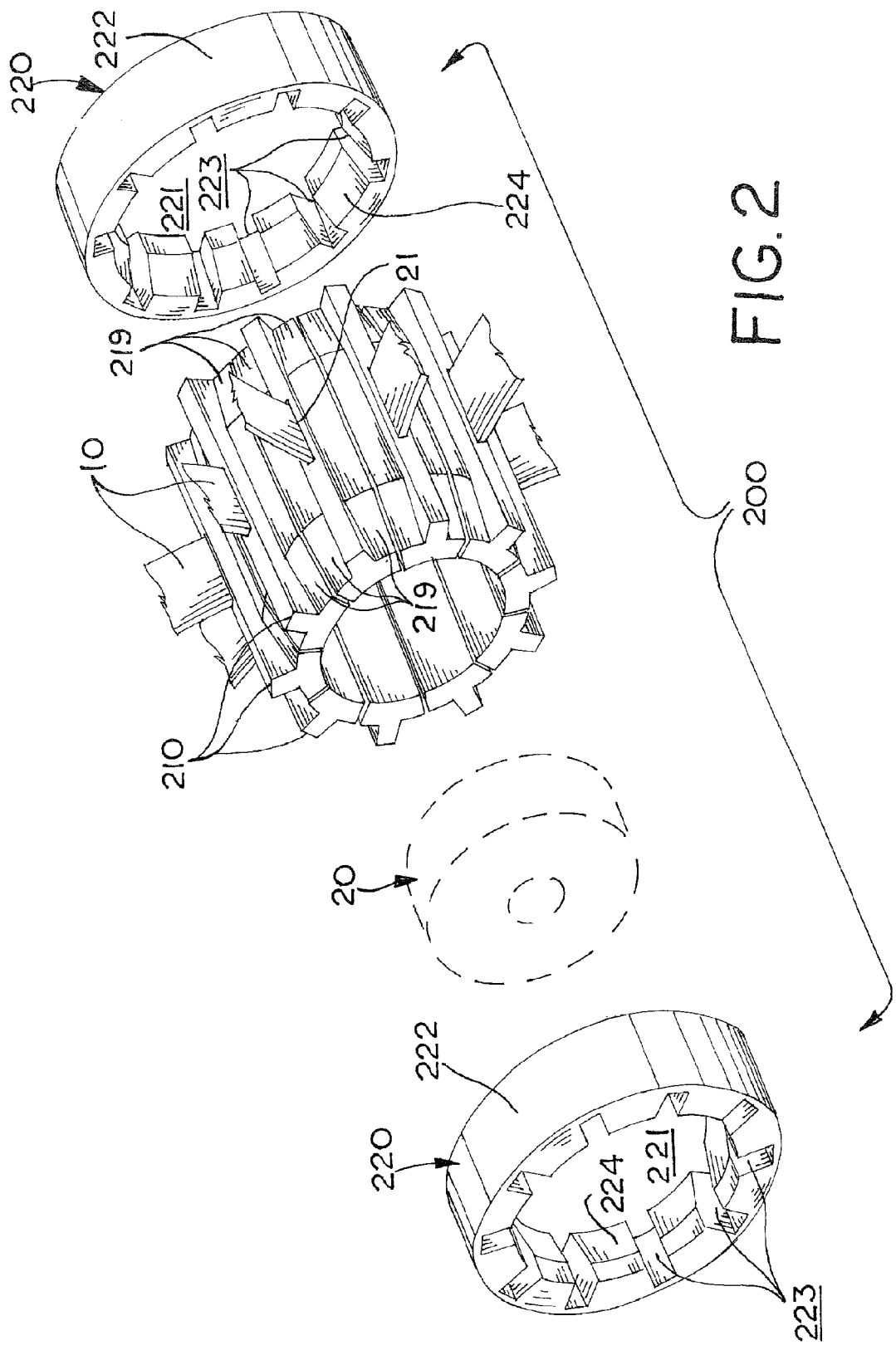
FIG. 2 is an exploded view of the collet assembly with a plurality of rotor blades and the rotor hub.
Figure 5:
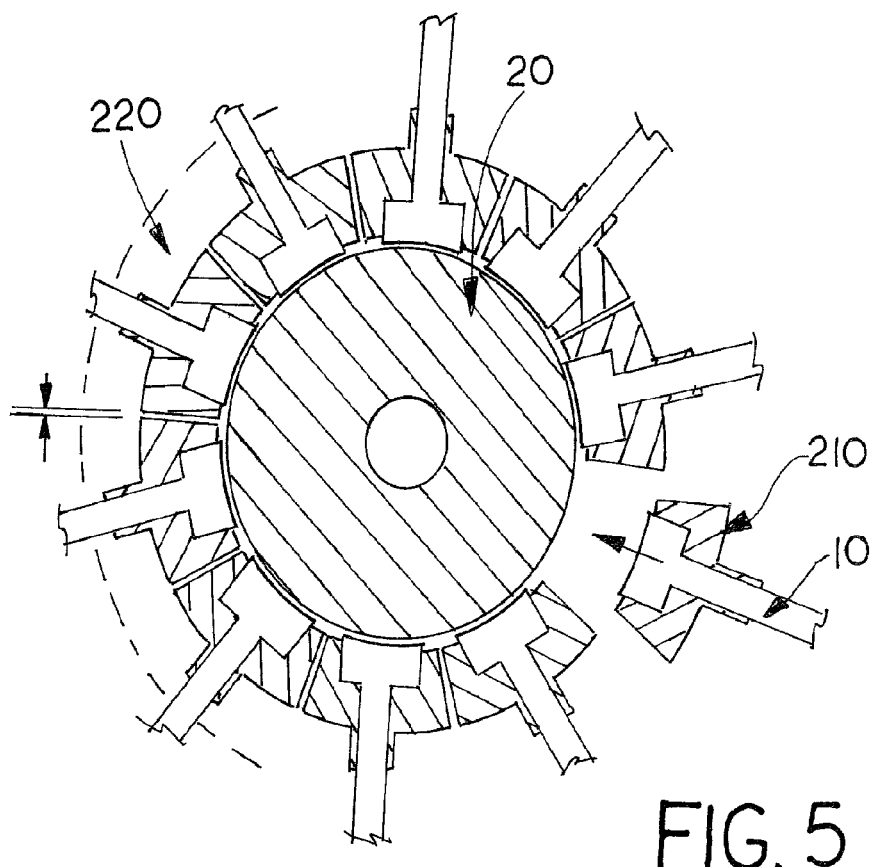
FIG. 5 is a sectional view of the collet assembly, rotor blades and rotor hub.

Once shaft 1020 and work pieces 1010, 1012 and 1014 are properly seated and secured to the fixtures 1220, and 1210, 1212 and 1214, respectively, the LFW machine can be activated to form the weld interface (FIG. 9). The vibrating assembly of the LFW machine vibrates shaft 1020 axially while the press assembly of the LFW machine presses work pieces 1010, 1012 and 1014 against the shaft under an initial load or "weld pressure" (FIG. 2). Friction causes the material at the weld surfaces of the shaft 1020 and work pieces 1010, 1012 and 1014 to plasticize. Once the weld surfaces are plasticized, the vibrating assembly abruptly terminates the vibration of shaft 1020 and the press assembly presses work pieces 1010, 1012 and 1014 against the shaft under a final load or forging pressure, which forms and sets the weld interface.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A linear friction welding system comprising:
   a fixture configured to hold a rotor hub defining an axis;
   a collet assembly configured to hold a plurality of rotor blades radially around the rotor hub, the collet assembly including a plurality of collet sections each of the plurality of collet sections configured to support a respective one of the plurality of rotor blades, and a movable annular collar part shiftably mountable over the plurality of collet sections, the plurality of collet sections and the movable annular collar configured such that shiftable movement of the movable annular collar axially into contact with the plurality of collet sections forces each of the plurality of collet sections radially inwardly;
   a press assembly operatively connected to the collet assembly and configured to forcibly move the movable annular collar part axially into contact with the plurality of collet sections thereby pressing the plurality of rotor blades inward radially against the rotor hub under selective loads; and
   a vibrating assembly operatively mounted to the fixture and configured to vibrate the rotor hub axially within the collet assembly so that the rotor hub moves along the axis to generate friction between the rotor hub and the plurality of rotor blades when the press assembly presses the plurality of rotor blades against the rotor hub.

2. A linear friction welding system comprising:
   a first fixture configured to hold a first work piece;
   a plurality of second fixtures each configured to hold a respective one of a plurality of second work pieces radially around the first work piece;
   a press assembly operatively connected to each of the plurality of second fixtures and configured to forcibly press each of the plurality of second work pieces against the first work piece under selective loads; and
   a linear vibrating assembly operatively connected to the first fixture and configured to vibrate the first work piece along an axis defined through the first work piece to generate friction between the first work piece and the plurality of second work pieces when the press assembly presses each of the plurality of second work pieces against the first work piece.

3. The linear friction welding system of claim 2, wherein each of the plurality of second fixtures comprises:
   a base portion including a first surface configured to contact a first portion of the respective first work piece, and further including an opening sized to receive a second portion of the respective first work piece therethrough.

4. The linear friction welding system of claim 3, wherein the first portion of the respective first work piece comprises a radially extending portion of the respective first work piece.

5. The linear friction welding system of claim 3, wherein:
   each of the plurality of second fixtures further comprises a first sloped end face and a second sloped end face;
   a shiftable annular collar operably connects the press assembly with each of the second fixtures, and includes a plurality of first sloped surfaces, each of the plurality of first sloped surfaces configured to engage the first sloped end face of a respective one of the plurality of second fixtures; and
   the system further comprises a fixed annular collar including a plurality of second sloped surfaces, each of the plurality of second sloped surfaces configured to engage the second sloped end face of a respective one of the plurality of second fixtures.

6. The linear friction welding system of claim 1, wherein each of the plurality of collet sections comprises:
   a base portion including a first surface configured to contact a first portion of the respective rotor blade, and further including an opening sized to receive a second portion of the respective rotor blade therethrough.

7. The linear friction welding system of claim 6, wherein the first portion of the respective rotor blade comprises a radially extending portion of the respective rotor blade.

8. The linear friction welding system of claim 6, wherein:
- each of the plurality of collet sections further comprises a first sloped end face and a second sloped end face;
- the shiftable annular collar includes a plurality of first sloped surfaces, each of the plurality of first sloped surfaces configured to engage the first sloped end face of a respective one of the plurality of collet sections; and
- the system further comprises a fixed annular collar including a plurality of second sloped surfaces, each of the plurality of second sloped surfaces configured to engage the second sloped end face of a respective one of the plurality of collet sections.

\* \* \* \* \*